United States Patent [19]
Miyamoto et al.

[11] Patent Number: 5,887,498
[45] Date of Patent: Mar. 30, 1999

[54] CYLINDRICAL MEMBER AND METHOD FOR PRODUCING THE SAME

[75] Inventors: Mitsuru Miyamoto, Yokohama; Yusuke Yamada, Kawasaki; Hiroshi Chiba, Ebina, all of Japan

[73] Assignee: Canon Kabushiki Kaisha, Tokyo, Japan

[21] Appl. No.: 609,211

[22] Filed: Mar. 4, 1996

Related U.S. Application Data

[62] Division of Ser. No. 210,929, Mar. 21, 1994, abandoned.

[30] Foreign Application Priority Data

Mar. 23, 1993 [JP] Japan ................................. 5-088094
Feb. 25, 1994 [JP] Japan ................................. 6-053141

[51] Int. Cl.⁶ ..................................................... B23B 1/00
[52] U.S. Cl. .................................. 82/1.11; 82/47; 82/130; 82/901
[58] Field of Search .............................. 82/1.11, 46, 47, 82/53, 53.1, 54, 56, 70.2, 130, 131, 901, 52; 407/11

[56] References Cited

U.S. PATENT DOCUMENTS

| | | | |
|---|---|---|---|
| 2,300,967 | 11/1942 | Reed et al. | 82/130 |
| 3,056,164 | 10/1962 | Reichel et al. | 492/33 |
| 3,176,330 | 4/1965 | Jennings | 407/11 |
| 4,514,936 | 5/1985 | Hurtado | 82/901 |
| 5,003,851 | 4/1991 | Kawada et al. | |
| 5,208,955 | 5/1993 | Schiel | 492/45 |

FOREIGN PATENT DOCUMENTS

| | | | |
|---|---|---|---|
| 569055 | 4/1924 | France | 492/36 |
| 684264 | 11/1939 | Germany | 492/36 |
| 3620410 | 1/1987 | Germany | 82/130 |
| 003844338 | 7/1990 | Germany | 82/901 |
| 514850 | 7/1957 | Italy | 492/36 |
| 55-054101 | 4/1980 | Japan . | |
| A-0212403 | 9/1988 | Japan | 82/47 |
| 2-110570 | 4/1990 | Japan . | |
| 4-04310303 | 11/1992 | Japan | 408/145 |

*Primary Examiner*—Frances Han
*Assistant Examiner*—Henry W.H. Tsai
*Attorney, Agent, or Firm*—Fitzpatrick, Cella, Harper & Scinto

[57] ABSTRACT

There are disclosed a cylindrical member, constituting the main body of an electrophotographic photosensitive drum or a developing sleeve adapted for use in an image forming apparatus such as electrophotographic copying machine, laser beam printer, facsimile or printer, and a producing method therefor. A work obtained by cutting a tube, is worked to a predetermined internal diameter at the left-hand end, and is supported by an opening collet of the left arbor, while the other end is supported by a closing collet of the right arbor. A cutting tool holder, supporting a rough cutting tool and a finish cutting tool, rotates around the work at a high speed, and the work is moved axially by the table. Thus, the rough cutting tool and the finish cutting tool move in the axial direction of the work while rotating along the external curved surface thereof, thus cutting the surface.

23 Claims, 10 Drawing Sheets

F I G. 2
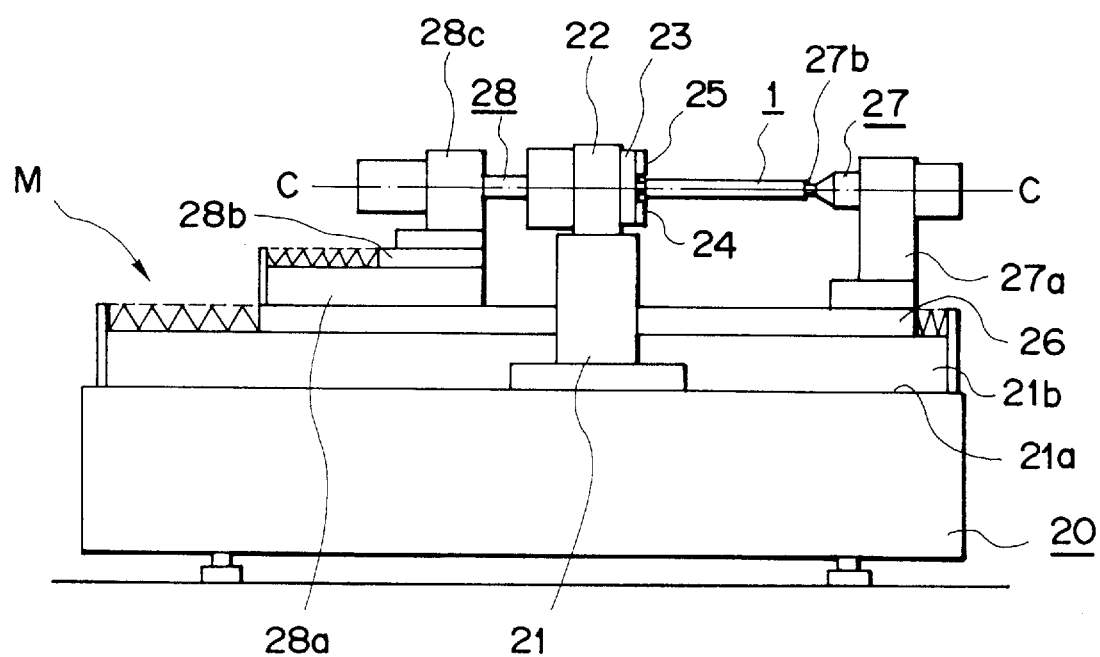

F I G. 10
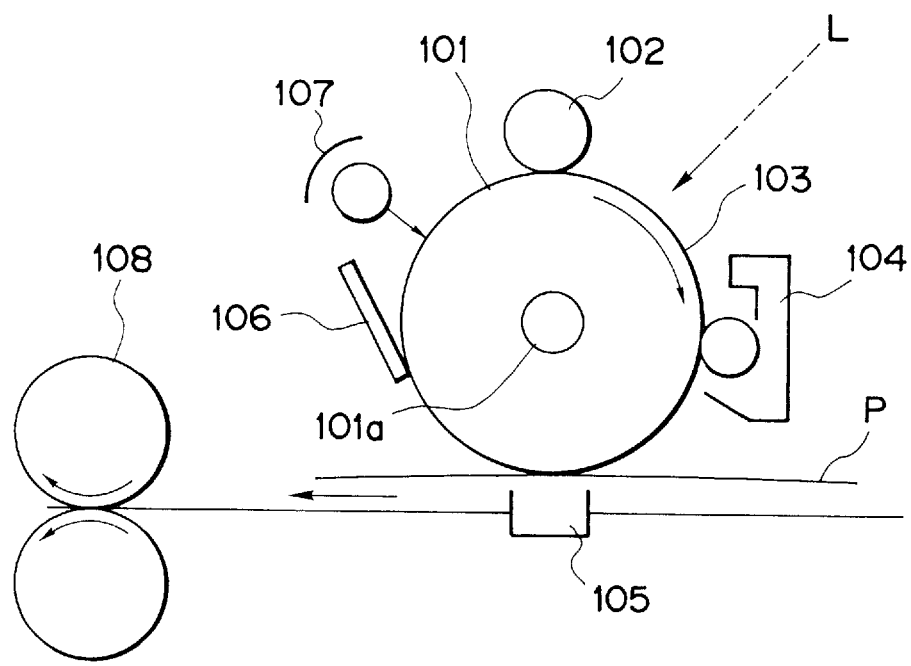

CYLINDRICAL MEMBER AND METHOD FOR PRODUCING THE SAME

This application is a division of application Ser. No. 08/210,929, filed Mar. 21, 1994, now abandoned.

BACKGROUND OF THE INVENTION

1. Field of the Invention

The present invention relates to a cylindrical member constituting a main body of a photosensitive drum, a developing sleeve or the like, adapted for use in an electrophotographic image forming apparatus such as a copying machine, a laser beam printer, a facsimile apparatus, a printing apparatus employing electrophotographic process, and also to a method for producing the same.

2. Related Background Art

The photosensitive drum or developing sleeve employed in the electrophotographic image forming apparatus such as copying machine, laser beam printer, facsimile apparatus, printing apparatus or the like has conventionally been based on a cylindrical member which is finished to a predetermined surface roughness. The electrophotographic photosensitive drum is produced by applying a photosensitive film onto the surface of such cylindrical member finished to a predetermined surface roughness, so that a deficiency in the surface precision or dimensional precision of the cylindrical member results in surface irregularity of the photo-sensitive film, causing a defect in the image formed by the image forming apparatus. Consequently, for producing an image forming apparatus of a high accuracy, there is required a cylindrical member which is extremely accurate in the straightness and roundness.

A cylindrical member of high surface precision, straightness and roundness is required also for the developing sleeve which is used, in developing a latent image formed on the photosensitive film by an electrophotographic process or an electrostatic recording process, for supporting and transporting developer of various types, such as one-component, two-component, magnetic, non-magnetic, insulating or dielectric developer.

The cylindrical member for such electrophotographic photosensitive drum or developing sleeve is generally composed of Al of a purity of 99.5% or higher, or an aluminum alloy such as a Cu-Al alloy containing Cu in 0.05 to 0.20%, a Cu-Mn-Al alloy containing Cu in 0.05 to 0.20% and Mn in 1.0 to 1.5%, a Si-Mg-Al alloy containing Si in 0.20 to 0.60% and Mg in 0.45 to 0.90%, or a Mn-Al alloy containing Mn in 1.0 to 1.5%. For producing the above-mentioned cylindrical member with such material, there have been developed, for example, a method of preparing a tube of high surface precision and dimensional precision by highly precise extrusion, drawing and bending correction, cutting the tube by a desired length and finishing the internal surface of both ends by cutting, and a method of cutting a pipe, prepared by extrusion and/or drawing, by a desired length, cutting the internal surface of both ends and finishing the curved surface by a cutting tool (Japanese Patent Laid-open Application No. 2-110570).

However, in such conventional technologies, the former method preparing a pipe of high surface precision and dimensional precision by extrusion, drawing and bending correction, then cutting the pipe by a desired length and cutting the internal surface of both ends is associated with a high manufacturing cost of the pipe member, because highly precise control is required in the steps of bending correction or the like. Also, the later method of cutting a pipe of low cost, prepared by extrusion and/or drawing, and rotating the cut pipe (hereinafter called "work") to finish the curved surface, tends to result in vibration of the work when it is rotated at a high speed in the cutting step, because of unevenness in thickness of the work, deficient straightness of the work or insufficient precision of the internal diameter at both ends. For this reason, the revolution of the work has to be limited to about 3,000 rpm, so that it is difficult to shorten the time required for the cutting step. Besides, the motor has to be stopped when the work is attached to or detached from the cutting machine, and there is required a long waiting time for the starting-up of motor in each working cycle of the work. As a result, the entire process cycle time becomes longer, and the manufacturing cost becomes inevitably higher.

SUMMARY OF THE INVENTION

The present invention has been made in consideration of the above-mentioned drawbacks of the conventional technologies, and its object is to provide a cylindrical member which has surface precision, straightness and roundness of an extremely high level, and which can significantly reduce the manufacturing cost through a higher speed in the surface finishing step and a reduced waiting time, and a method for producing such cylindrical member.

The above-mentioned object can be attained, according to the present invention, by a cylindrical member consisting of a tubular member of which internal surface is at least partly worked to a predetermined internal diameter and comprising an external curved surface cut to a predetermined surface roughness, prepared by supporting the tubular member along a predetermined axis by support means engaging with the internal surface and by cutting with cutting means rotating around the axis.

The cylindrical member is further featured by comprising an external curved surface cut to a predetermined surface roughness, prepared by supporting the tubular member along a predetermined axis and by cutting with cutting means rotating around the axis while collecting the cutting wastes generated by the cutting means with a hood surrounding the cutting means and suction means connected to the hood.

The cylindrical member is further featured by comprising an external curved surface cut to a predetermined surface roughness, prepared by providing the tubular member with at least a shallow groove extending along the axial direction thereof, then supporting the tubular member along a predetermined axis and cutting with cutting means rotating around the axis.

Also, a method for producing the cylindrical member of the present invention comprises a step of cutting the external curved surface of a tubular member, supported along a predetermined axis, with cutting means rotating around the axis, wherein the tubular member is worked, in a part of the internal surface thereof, to a predetermined internal diameter and is supported by support means engaging with the internal surface.

The method for producing the cylindrical member of the present invention is also featured by a step of cutting the external curved surface of a tubular member, supported along a predetermined axis, with cutting means rotating around the axis, wherein the cutting wastes generated by the cutting means are collected by a hood surrounding the cutting means and suction means connected to the hood.

The method for producing the cylindrical member of the present invention is also featured by a step of cutting the external curved surface of a tubular member, supported along a predetermined axis, with cutting means rotating around the axis, wherein the external curved surface of the tubular member is provided with at least a shallow groove extending along the axial direction thereof.

Since the tubular member is supported along a predetermined axis and subjected to the cutting of the external curved surface by cutting means rotating around the axis, without rotation of the tubular member itself, there is no danger of generation of vibration, which may result from uneven thickness distribution or deficient straightness of the tubular member when it is rotated, even at a high cutting speed. Consequently the working step can be easily made faster. Also because the tubular member can be replaced while the cutting means is maintained in rotation, there can be reduced the waiting time and the entire work cycle time. As a result, there can be achieved a significant reduction in the manufacturing cost.

Besides the precision of centering with respect to the cutting means can be improved by supporting the tubular member by means of support means engaging with the internal surface, worked at least partly to a predetermined internal diameter, of said tubular member, so that there can be obtained a cylindrical member with the external curved surface excellent in surface precision, roundness and straightness even if the tubular member is associated for example with uneven thickness distribution.

Furthermore, the collection of the cutting wastes generated by the cutting means, by means of a hood surrounding the cutting means and suction means connected to the hood, avoids the eventual damage to the external curved surface of the tubular member by the cutting wastes, so that there can be obtained the cylindrical member with external curved surface of high surface precision.

Furthermore, at least a shallow groove provided on the external curved surface of the tubular member and extending along the axial direction thereof serves to break the cutting wastes into small pieces, thereby avoiding clinging of such cutting wastes to the cutting means and thus eliminating the causes of limitation in the speed of the cutting step and damage to the external curved surface. It is therefore made possible to achieve improvements in the speed and precision of the working process. Furthermore, cutting agent, if supplied to at least a side of the cutting means, can achieve, by the lubricating and cooling effects thereof, further improvements in the speed and precision of the surface finishing.

BRIEF DESCRIPTION OF THE DRAWINGS

FIGS. 1A and 1B are cross-sectional views showing steps of producing a work, wherein FIG. 1A shows a work obtained by cutting a tube member, while FIG. 1B shows a work having a part enlarged in the internal diameter at an end and provided with a shaft portion mounted at the other end;

FIG. 2 is a schematic view of a cutting apparatus;

FIGS. 5A, 5B, 5C and 5D are views showing a finish cutting tool, wherein FIGS. 5A, 5B and 5C are respectively a front view, a top view and side view and FIG. 5D is a schematic view of screws and metal pieces for mass adjustment;

FIG. 10 is a schematic view of an ordinary transfer-type electrophotographic apparatus employing a photosensitive drum.

DESCRIPTION OF THE PREFERRED EMBODIMENTS

Now the present invention will be clarified in detail by an embodiment thereof, with reference to the attached drawings.

Figure 1A:
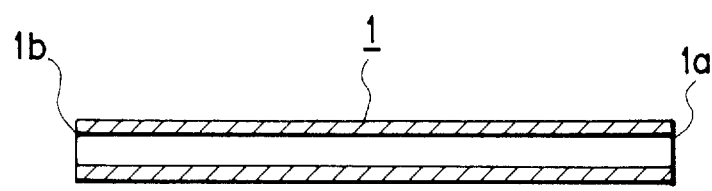
Figure 1B:
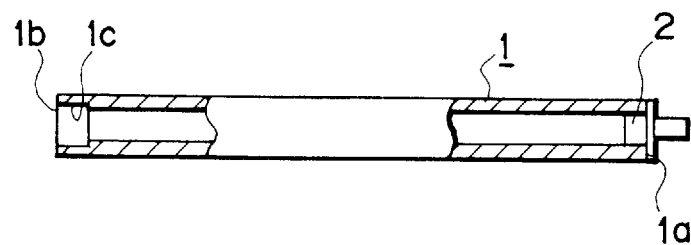

FIGS. 1A and 1B illustrate the steps of working an end and mounting a shaft portion on a tubular member (hereinafter called "work") obtained by cutting, into a predetermined length, a pipe prepared by known extrusion and/or drawing. FIG. 1A shows the cross-section of the work 1 after cutting from the pipe, while FIG. 1B shows a state in which a shaft portion 2 is mounted on an end 1a of the work 1 while an internally enlarged portion 1c is provided at the other end 1b. The internally enlarged portion 1c is formed by cutting a part of the internal surface of the work 1 to a predetermined internal diameter with a high precision, thereby forming an annular groove of extremely high roundness and straightness, and serves to be supported by an open collet, constituting support means to be explained later, in cutting the external curved surface of the work 1 by means of a cutting apparatus shown in FIG. 2, whereby the work 1 can be highly precisely centered with respect to the cutting apparatus M.

The shaft portion 2 is to be supported by a closed collet of the cutting apparatus M, but the centering of the work 1 can be further assured by replacing the shaft portion 2 with an internally enlarged portion similar to the portion 1c, to be supported by an open collet.

The thickness unevenness of the pipe member prepared by drawing as explained above is 30 to 100 μm in the present technical level, and the thickness unevenness below this level cannot be eliminated. On the other hand, the cutting apparatus M is designed to cut the external curved surface of the work 1 by cutting means moving in a circumferential direction thereof, without rotation of the work 1, and is therefore free from generation of vibration in the course of cutting or from significant deterioration of the precision, as encountered in the conventional cutting by the rotation of the work 1 even if the work 1 is associated with certain thickness unevenness or deficiency in straightness. But, the insufficient centering precision resulting from the thickness unevenness still significantly affects the working precision of the cutting apparatus M.

It is possible to finish the external peripheral surface of the work 1 with surface precision, straightness and roundness of extremely high level by forming the internally enlarged portion 1c of high roundness and straightness at least at an end of the work 1 as explained before and supporting the enlarged portion 1c by means of an open collet, thereby improving the precision of centering. The depth of the internally enlarged portion 1c, namely the difference between the internal diameter of the work 1 before the formation of the internally enlarged portion 1c and that of the internally enlarged portion 1c is preferably two to three times of the thickness unevenness of the work 1, because a difference less than twice cannot provide a sufficient centering precision, while a difference in excess of three times leads to an insufficient thickness of the work 1, resulting in an insufficient strength thereof.

The cutting apparatus M is composed of a gate-shaped column 21 fixed on the upper face 21a of a bed 20 fixed in turn for example on a floor; a disklike holder 23 of cutting tool integral with a hollow shaft (shown in FIG. 4B) rotatably supported by a bearing 22 held by the gate-shaped column 21; a rough cutting tool 24 and a finish cutting tool 25 constituting cutting means supported by the cutting tool holder 23; a table 26 slidably supported on a table support member 21b integral with the bed 20; a right arbor 27 supported by a right post 27a provided on the table 26 at the right-hand side in the drawing; and a left arbor 28 supported by a left post 28c which is in turn supported, across a slider 28b and a slider support member 28a, on the table 26 at the left-hand side in the drawing. The slider 28b is slidably supported on the slider support member 28a and can be retracted to the left-hand end, in the drawing, of the slider support member 28a by means of slider retracting device (not shown). The work 1 is clamped, by the shaft portion 2 at the end 1a, by the closed collet 27b of the right arbor 27, and by the internally enlarged portion 21c at the other end 1b, by the open collet (shown in FIG. 3A) of the left arbor 28, thereby being supported along the central axis of the hollow shaft, constituting the predetermined axis indicated by a line C—C. The rough cutting tool 24 and the finish cutting tool 25 rotate at a high speed about the work 1, by high-speed rotation of the hollow shaft driven by motor (not shown), and the table 26 moves in the axial direction of the work 1 by means of a driving device (not shown), thereby advancing the rough cutting tool 24 and the finish cutting tool 25 in the axial direction of the work 1.

The rough cutting tool 24 and the finishing tool 25 are surrounded by a hood H (omitted in FIGS. 2, 3A, 3B and 3C) for collection of the cutting wastes and supply and collection of the cutting agent as will be explained later.

In the following there will be explained the cutting steps of the external peripheral surface of the work 1 by the cutting apparatus M, with reference to FIGS. 3A, 3B and 3C.

Figure 3A:
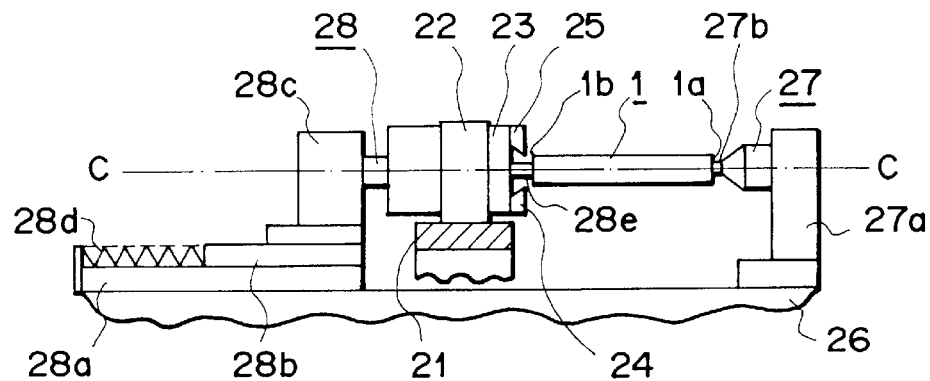
FIGS. 3A, 3B and 3C are partial schematic views showing the cutting steps by the cutting apparatus, respectively illustrating a state immediately before the start of cutting, a state during the cutting and a state after the cutting step.

At first the table 26 is moved to the right-hand end of the table support member 21b, then the work 1 is brought into between the left arbor 28 and the right arbor 27, and is clamped, at the shaft portion 2 at the end 1a of the work 1, by the closing collet 27b of the right arbor 27 and, at the other end 1b, by the opening collet 28e of the left arbor 28 whereby the state shown in FIG. 3A is reached. During these operations, the rotation of the hollow shaft, namely the rotation of the rough cutting tool 24 and the finish cutting tool 25, is maintained without interruption from the preceding cutting cycle.

Figure 3B:
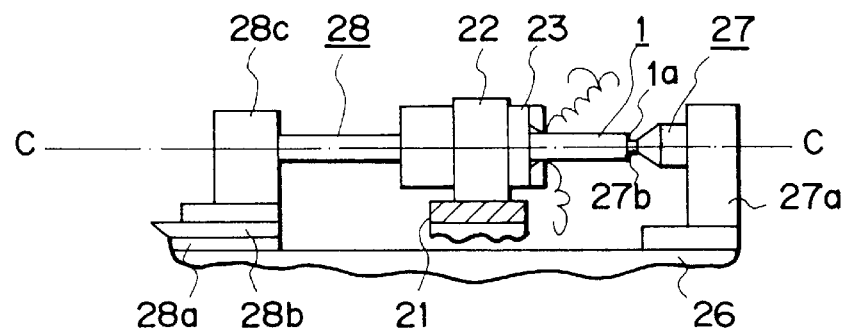
Figure 3C:
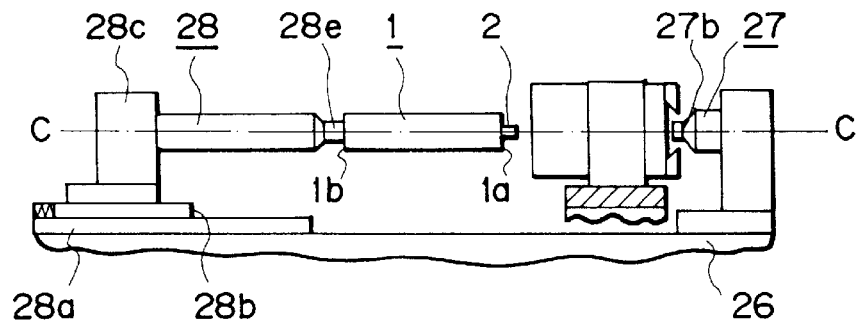

Then the table 26 is moved to the left as shown in FIG. 3B, thereby cutting the external curved surface of the work 1 by means of the rough cutting tool 24 and the finish cutting tool 25. When the cutting is completed over the entire length of the work 1, the closed collet 27b of the right arbor 27 is opened and the slider 28b is retracted to move the work 1 to the left. After the work 1 is entirely moved to the left-hand side of the hollow shaft and the cutting tool holder 23 still maintained in rotation, through the central hole thereof, the open collet 28e of the left arbor 28 is reduced in diameter and the work 1 is taken out.

Figure 4B:
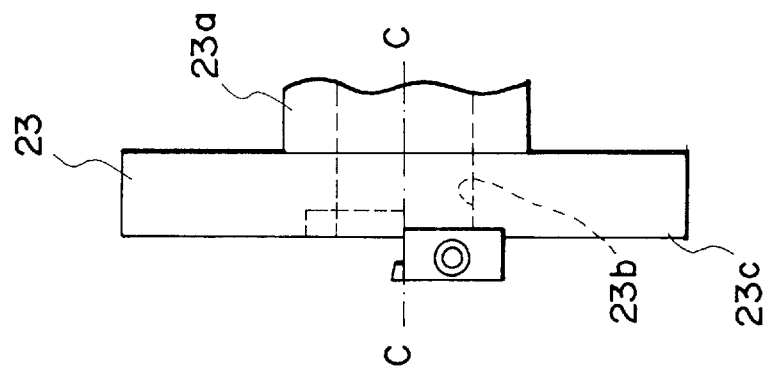
FIGS. 4A and 4B are respectively a front view and a side view of a rough cutting tool, a finish cutting tool and a tool holder with the finish tool in a separated state.
Figure 4A:
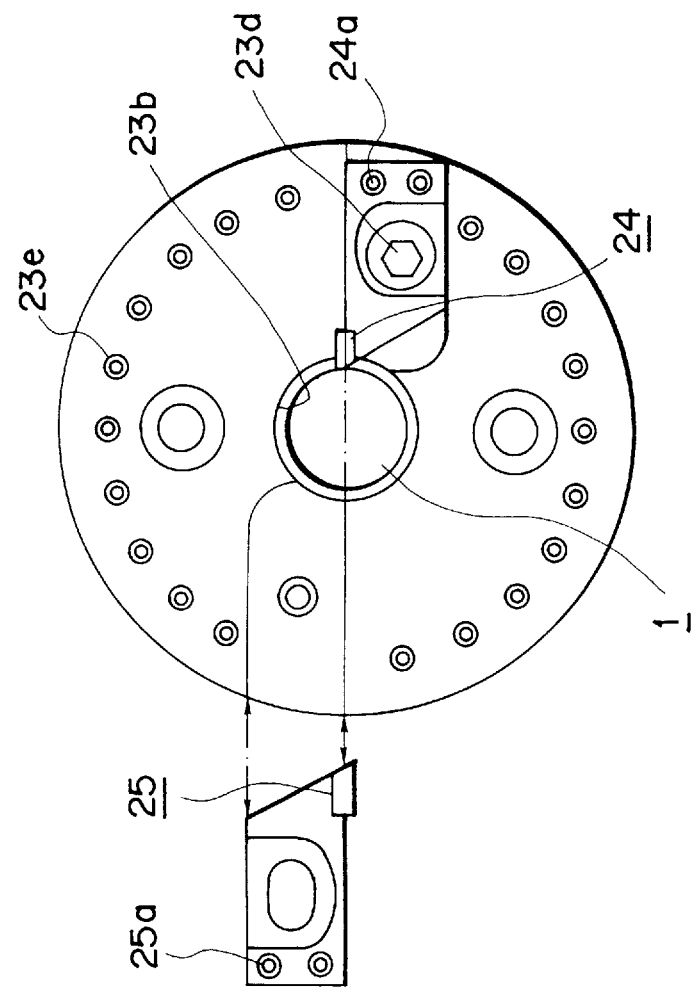
Figure 5A:
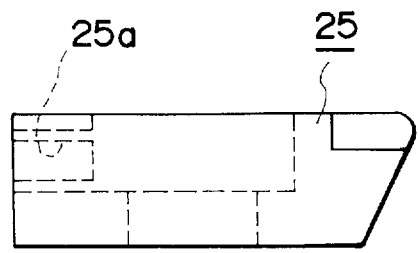
Figure 5C:
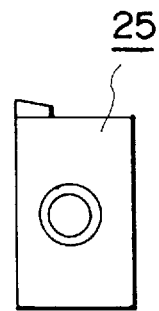
Figure 5B:
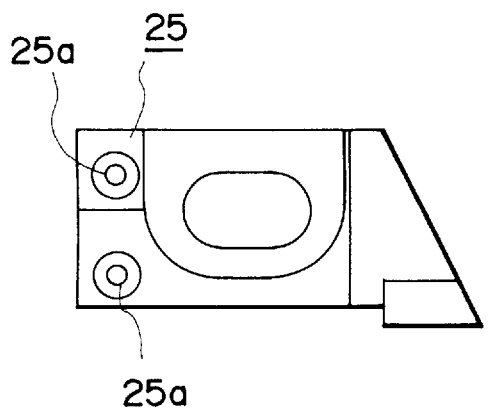
Figure 5D:
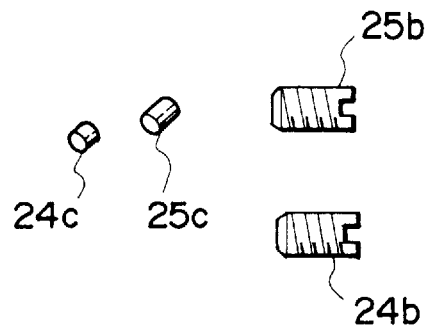

In the following there will be given an explanation on the rough cutting tool 24, the finish cutting tool 25 and the cutting tool holder 23 holding these tools, with reference to FIGS. 4A, 4B, 5A, 5B, 5C and 5D. As shown in FIG. 4B, the cutting tool holder 23 is integrally provided at an end of the hollow shaft 23a, and has a central hole 23b coaxial with the hollow shaft 23a. Also as shown in FIG. 4A, the rough cutting tool 24 and the finish cutting tool 25 are fixed, by means of bolts 23d, on a face 23c of the cutting tool holder 23, in radially opposite positions. In order to prevent vibration during high-speed rotation, the cutting tool holder 23 is provided with a plurality of threaded holes 23e along the periphery thereof, and unbalance in mass is resolved by mounting small screws (not shown) into suitable ones of the above-mentioned threaded holes. Furthermore, the rough cutting tool 24 and the cutting tool 25 are respectively provided with two threaded holes 24a, 25a and, in order to resolve the mass unbalance resulting from the weight difference between these tools, there are mounted small screws 24b, 25b as shown in FIG. 5D.

Each of the rough cutting tool 24 and the finish cutting tool 25 is provided with a blade of monocrystalline or sintered diamond, and these tools should be so mounted that the rough cutting tool 24 axially precedes the finish cutting tool 25 by a distance of 1 to 4 mm during the cutting operation.

This arrangement is to prevent interference of the cutting wastes, generated by the preceding rough cutting tool 24, with the cutting operation of the finish cutting tool 25, eventually leading to the damage on the external curved surface of the work 1, thereby ensuring the formation of desired surface roughness. If the rough cutting tool 24 precedes more than 4 mm, there will result an increased weight of the cutting tool holder 23, leading to an increased load of rotation and undesirably affecting the durability of the apparatus, while a separation of the rough cutting tool 24 and the finish cutting tool 25 less than 1 mm results in undesirable interference of the cutting wastes, generated by the rough cutting tool 24, with the cutting operation of the finish cutting tool 25.

Figure 6:
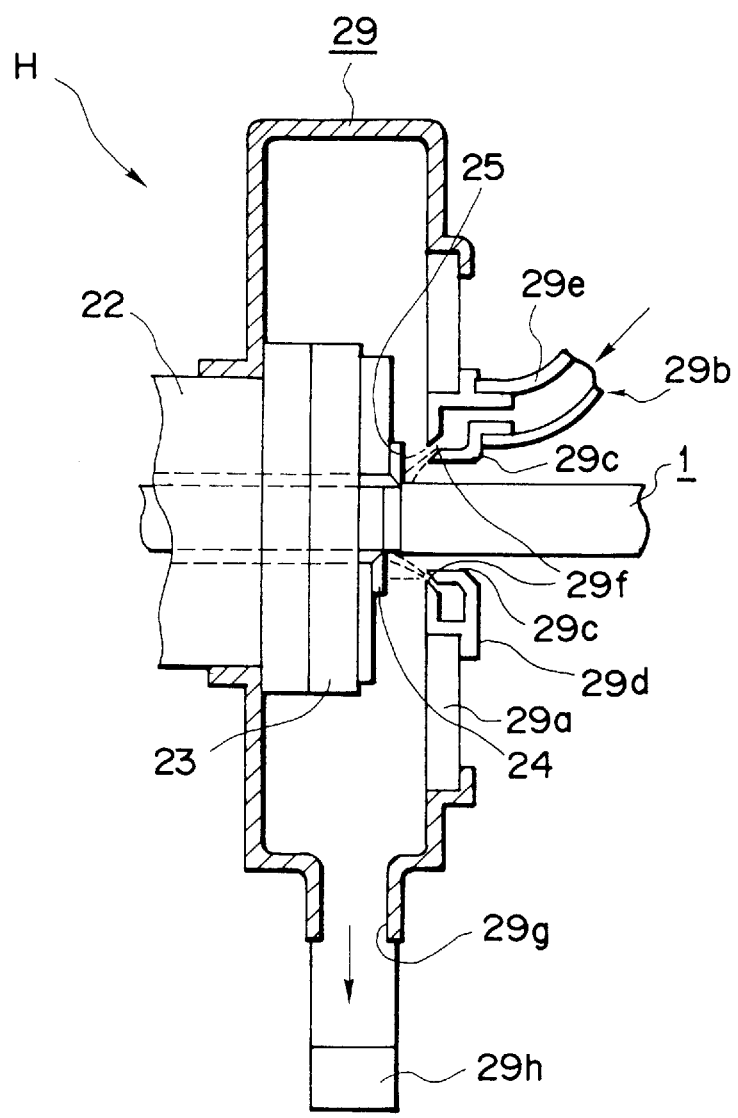
FIG. 6 is a partially cut-off lateral view of a hood mounted on the external surface of a bearing.

FIG. 6 illustrates a hood H for effecting supply of the cutting agent to the rough cutting tool 24 and the finish cutting tool 25 and collection of the cutting wastes therefrom, as explained before. The hood H is composed of a hollow member 29 fixed at an end thereof to the bearing 22 integral with the gate-shaped column 21. The hollow member 29 supports, at the other end thereof, across a support member 29a, a cutting agent supply device 29b, which is provided with a hollow annular member 29d having an aperture 29c for passing the work 1, and a supply pipe 29e for introducing the cutting agent into the hollow part, and the annular member 29d is provided with plural nozzles 29f for emitting the cutting agent from said hollow part toward the blades of the rough cutting tool 24 and the finish cutting tool 25. In the periphery of the hollow member 29 there is provided a collection aperture 29g which serves to collect the cutting wastes and the cutting agent, and which is connected to a suction unit 29h constituting the suction means.

The cutting agent may be in liquid form or in mist form. The cutting agent supplied by the supply device 29b exerts cooling effect by absorbing the heat generated in the cutting operation, thereby lowering the cutting temperature and avoiding the thermal deformation of the work 1, rough cutting tool 24 and finish cutting tool 25. It also has a lubricating effect of reducing the friction at the interface in the cutting operation, thereby retarding the blunting of the sharp cutting edge constituting the cutting blades.

Also the collection of the cutting wastes generated in the cutting operation and the cutting particles cleaved from the cutting blades by the suction unit 29h through the aperture 29g prevents the damage to the surface of the cylindrical member by such cutting wastes and cutting particles.

The amount of supply of the cutting agent should be in a range of 0.03 to 0.1 cc/sec., preferably 0.04 to 0.08 cc/sec. A supply amount less than 0.03 cc/sec. is excessively small and may result in a trouble such as seizing, while an amount in excess of 0.1 cc/sec. is unnecessary for the above-mentioned effects. The cutting agent can, for example, be kerosine, water-soluble cutting oil or water-insoluble cutting oil, but kerosine is preferred in consideration of the removal of the cutting agent.

It is also important to promptly collect the cutting agent emitted into the hood H.

The amount of suction air by the suction unit 29h should be in a range of 1.5 to 6.0 m$^3$/min., preferably 1.5 to 5.0 m$^3$/min. An amount exceeding 6.0 m$^3$/min. is excessively large and tends to suck the cutting agent before reaching the cutting tools, so that it becomes difficult to appropriately regulate the amount of supply of the cutting agent. On the other hand, an amount less than 1.5 m$^3$/min. is excessively low, so that the cutting wastes cannot be removed promptly.

Figure 7:
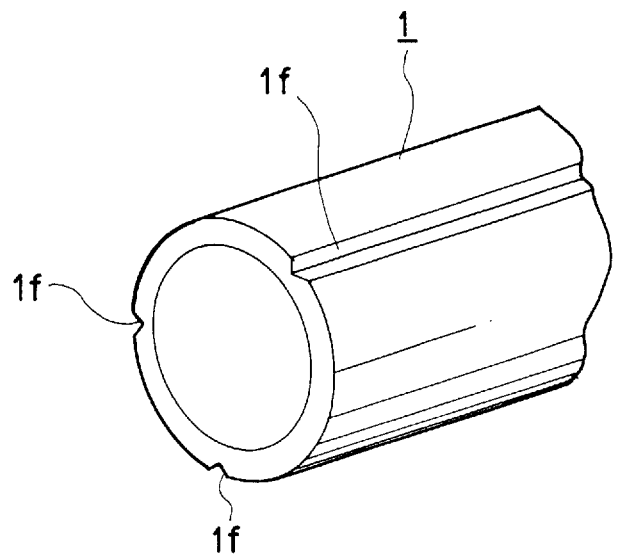
FIG. 7 is a partial perspective view showing grooves to be provided on the work.

It is furthermore effective to provide the external curved surface of the work 1 prior to the cutting, with an axial shallow groove lf as shown in FIG. 7. Such groove serves to break the cutting wastes generated by the rough cutting tool 24, thereby reducing the size of the cutting wastes and facilitating removal thereof. Thus there are reduced the danger of damage to the external curved surface of the work 1 and the danger that the cut surface is roughed by the heat generated on the blade by defective distribution of the cutting agent thereon, caused by the cutting wastes clinging to the cutting blade. The depth d of each groove lf should preferably satisfy the following relation:

$$(A/2-R) \geq d \geq A/2-R-0.01 \text{ (mm)}$$

wherein A: cut amount for forming the groove 1f;

R: straightness of the work 1.

The cut amount is the difference between the external diameter of the work 1 and the finished external diameter thereof, and is preferably 4 to 6 times of the straightness of the work 1. Each shallow groove 1f preferably has a triangular cross section with an angle of 45° to 90°. An angle exceeding 90° is undesirable because of a significant deformation given to the work 1 at the groove cutting, while an angle less than 45° is also undesirable because of the shortened service life of the groove cutting tool to be explained later. The shallow grooves lf are provided in a number of 2 to 6, preferably 3 to 6, at equal distances along the circumference of the work 1.

Figure 8:
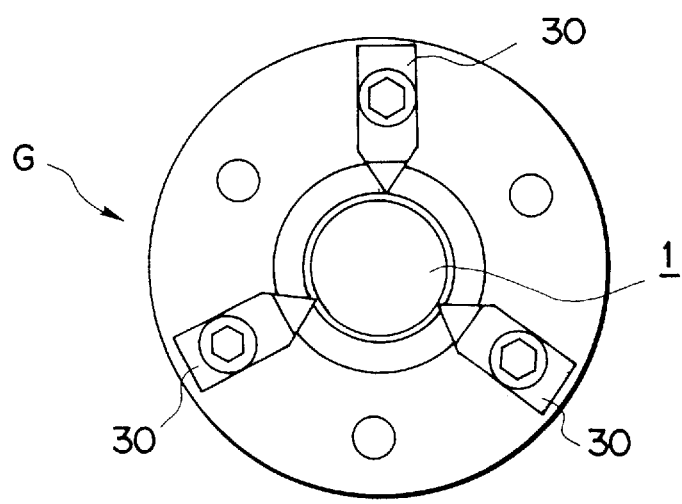
FIG. 8 is a schematic view of a groove cutting tool for forming shallow grooves on the work.

The shallow grooves lf are formed by a groove cutting apparatus G provided, as shown in FIG. 8, with plural groove cutting tools 30 which are positioned at circumferentially equal distances toward the external curved surface of the work 1.

Figure 9:
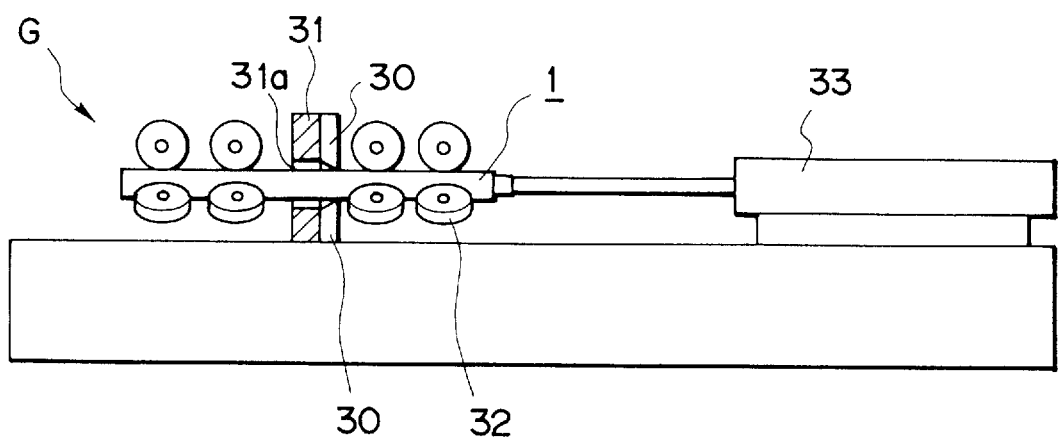
FIG. 9 is a schematic view of a groove cutting apparatus for forming shallow grooves on the work.

FIG. 9 illustrates the entire groove cutting apparatus G, in which the above-mentioned groove cutting tools 30 are supported by hollow holder 31, while the work 1 is guided by rollers 32 arranged in sets of three each which are positioned at distances of 120°, and is axially moved by a cylinder 33 through the central hole 31a of the holder 31.

The present embodiment allows to significantly increase the rotating speed in comparison with the conventional method, because the rotating motion conducted by the rough cutting tool and the finish cutting tool instead of the axially extended work avoids the generation of vibration, and also because the supply of cutting agent and the collection of cutting wastes can be smoothly achieved. For example, a hollow shaft with the internal diameter of 30 to 50 mm enables the cutting operation at a revolution of 10,000 rpm or even higher, so that the actual cutting time can be reduced to ⅓ of that in the conventional method. Besides, as the motor need not be stopped during the replacement of the work, the process cycle time can be furthermore shortened.

The photosensitive drum assumes various structures depending on the electrophotographic process to which the drum is applied. The representative of such drum is a drum having a photoconductive layer on the cylindrical member, and a drum having a protective layer thereon. The photosensitive drum consisting of the cylindrical member and the photoconductive layer is used in image formation by the most basic electrophotographic process consisting of the steps of charging, imagewise exposure and image development, eventually followed by image transfer. In case of the photosensitive drum with the protective layer, said protective layer is provided for protection of the photoconductive layer, improvement of the mechanical strength of the drum and of the dark decay characteristics and/or application to a particular electrophotographic process.

In the following there will be explained, as reference, representative examples of image bearing members other than the photosensitive drum.

(1) For the purpose of improving the repetitive usability of the electrophotographic photosensitive member, there is known a process of transferring an electrostatic image, formed on the photosensitive member, onto another image bearing member, then developing the electrostatic image and transferring the obtained toner image onto a recording member.

(2) As another electrophotographic process in which an electrostatic image is formed on another image bearing member, corresponding to an electrostatic image formed on an electrophotographic photosensitive member, there is known a process consisting of forming an electrostatic image by a specified electrophotographic process on a screen-like electrophotographic photosensitive member having a plurality of small apertures, then corona discharging another image bearing member through thus formed electrostatic image, thereby modulating the ion flow of corona discharge and thus forming an electrostatic image on the other image bearing member, then developing thus formed electrostatic image with toner and transferring the developed toner image onto a recording member as the final image.

(3) Also in another electrophotographic process, the toner image on an electrophotographic photosensitive member or on another image bearing member is not transferred directly to the recording member but is transferred onto another image bearing member and then is transferred therefrom onto the recording member and fixed. Such process is particularly effective in case of formation of a color image or of high-speed copying. Since the recording member is usually composed of a flexible material such as paper or film, a more precisely aligned color image can be more easily obtained, rather than by transferring the images of three colors in succession to the recording member with exact alignment each time, by transferring the images of three colors onto an image bearing member composed of a material practically free from deformation and then transferring these images at a time therefrom onto the recording member. Also such transfer of the toner image to the recording member by way of the image bearing member is effective for high-speed recording.

(4) In another process, electrical signals are applied to multineedle electrodes to form an electrostatic image, corresponding to the electrical signals, on an image bearing member, and the electrostatic image is then developed into a visible image.

The image bearing members employed in the electrostatic image forming processes as explained in (1) to (4) do not require the photoconductive layer.

Thus, the image bearing member on which an electrostatic image or a toner image is formed includes the electrophotographic photosensitive members of which surface is composed of a protective layer or a photoconductive layer, and various other member of which surface is usually composed of an insulating layer.

The surface roughness of the cylindrical member has the following effects. The photosensitive layer to be coated on the cylindrical member has to be formed with an extremely small and uniform thickness. In this relation, the surface roughness affects the uniformity of thickness of the photosensitive layer, and deteriorates the image to be formed thereon. In general, the coated thickness of the photosensitive layer is within a range of 40 to 50 $\mu$m, and the image becomes deteriorated if the surface roughness Rmax exceeds 1.5 $\mu$m. Thus a surface roughness Rmax not exceeding 1.5 $\mu$m can improve the image quality. However, a thickness less than 40 $\mu$m causes certain deterioration of the image. For this reason, a surface roughness Rmax not exceeding 1.0 $\mu$m is preferred, as a satisfactory image can be obtained even at a film thickness of 40 $\mu$m.

The surface roughness Rmax is measured with a surface roughness measuring instrument (Surfcorder SE-3300 manufactured by Kosaka Kenkyusho) under following conditions:

Speed: 0.5 mm/sec.

Cut-off: 0.8 mm

Length of measurement: 2.5 mm

FIG. 10 is a schematic view of an ordinary transfer-type electrophotographic apparatus employing a photosensitive drum, in which the drum 101 serves as an image bearing member and is rotated in a direction indicated by an arrow, about a shaft 101a, at a constant peripheral speed. In the course of rotation, the photosensitive drum is uniformly charged, either positively or negatively, by charging means 102, and is subjected to exposure L of a light image (slit exposure, exposure by laser beam scanning, or the like) by image exposure means (not shown) in an exposure unit 103, whereby electrostatic latent images corresponding to the exposed images are formed in succession on the curved surface of the photosensitive drum.

The electrostatic latent images are then developed with toner in developing means 104, and thus obtained toner images are transferred by transfer means 105 in succession onto transfer materials P, which are supplied from a sheet feeding unit (not shown) into a gap between the photosensitive drum 101 and the transfer means 105, in synchronization with the rotation of the photosensitive drum.

The transfer material P, having received the transferred image, is separated from the photosensitive drum and is subjected to image fixation in image fixing means 108, and is discharged as a copy from the apparatus.

The surface of the photosensitive drum after image transfer is subjected to cleaning, for removing the remaining toner, by cleaning means 106, and subjected to charge elimination by pre-exposure means 107, thereby being prepared for use in the next image formation.

The charging means 102 for the photosensitive drum is generally composed of a corona charging device. Also the transfer means 105 is usually composed of a corona transfer device. Among the above-mentioned components, such as the photosensitive drum, developing means, cleaning means etc. in the electrophotographic apparatus plural ones may be constructed as an integral unit which is rendered detachable from the apparatus. For example at least one of the charging means, developing means and cleaning means may be constructed as an integral unit including the photosensitive member and detachable from the apparatus, utilizing guide means such as rails provided in the apparatus. In such case, the charging means and/or developing means may be included in such unit.

In the case that the electrophotographic apparatus is used as a copying machine or a printer, the imagewise exposure L is conducted by the light reflected or transmitted by an original, or by laser beam scanning, an LED array or a liquid crystal shutter array driven by signals obtained by reading the original.

Figure 11:
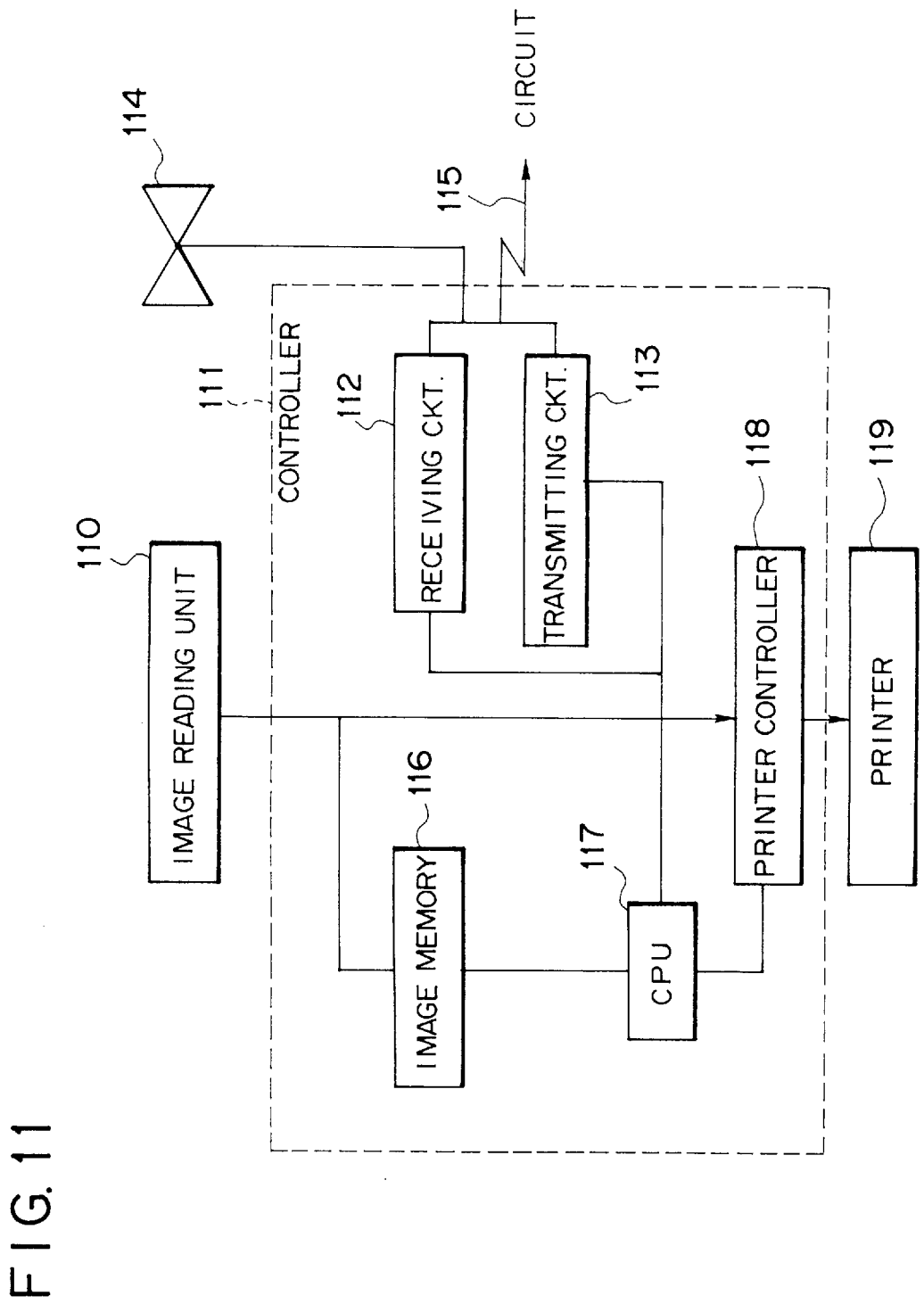
FIG. 11 is a block diagram of a light receiving unit, for receiving imagewise exposure, of a facsimile apparatus.

Also, in the case that it is used as the printer for a facsimile apparatus, the imagewise exposure L is used for printing the received data, and FIG. 11 is a block diagram showing an example of the circuit in such case.

A controller 111, controlled by a CPU 117, controls an image reading unit 110 and a printer 119. Read data from the image reading unit are transmitted, through a transmission circuit 113, to a partner station of destination. Data received from the partner station are supplied, through a receiving circuit 112, to the printer 119. There are also provided an image memory 116 for storing certain image data, a printer controller 118 for controlling the printer 119, and a telephone set 114.

An image received from a line 115 (image information from a remote station connected through the line) is demodulated in the reception circuit 112, then subjected to multiplexing process of image information by the CPU 117 and stored in succession in the image memory 116. When the image of at least a page is stored in the memory 116, the image of the page is recorded. The CPU 117 reads the image information of a page from the memory 116, and sends multiplexed image information of a page to the printer controller 118, which in response controls the printer 119 so as to record the image information of the page.

During the recording operation of the printer 119, the CPU 117 receives the information of a next page.

The reception and recording of image are conducted in the above-explained manner.

The developing sleeve is a developing device for rendering visible the latent image, formed by an electrophotographic process or an electrostatic recording process on an image bearing member such as an electrophotographic photosensitive member or an electrostatic recording dielectric member. It is used for supporting and transporting developer of various kinds, such as one-component, two-component, magnetic, non-magnetic, insulating or dielectric developer, but, in any case, the image becomes deteriorated if the coated state of the developer is uneven. Particularly in case of the one-component magnetic or non-magnetic developer, since an extremely thin layer of developer is formed, for transportation to the developing area constituted by the photosensitive drum and the developing sleeve, by the charge generated by the friction between the developer particles and between the developer particle and the developing sleeve, the image is significantly influenced by the surface roughness Rmax, and the image density becomes uneven if the surface roughness Rmax is equal to or larger than 2.0 μm. Such unevenness is alleviated by a surface roughness Rmax less than 2.0 μm, and a preferred range of the surface roughness is therefore 1.5 μm or less.

Examples according to the embodiment will be described.

EXAMPLES 1–17

A photosensitive drum was prepared by cutting an aluminum drawn pipe (material: A6063) into a predetermined length, cutting the internal surface in the vicinity of an end to expand the internal diameter by 0.2 mm and cutting the external surface under the following conditions:

Cutting agent: kerosine
Cutting agent supply amount: 0.025 cc/sec.
Suction rate by suction unit: 2.5 m$^3$/min.
Distance between rough cutting tool and finishing tool: 1.5 mm
Revolution: 11,000 rpm
Cutting feed rate: 0.04 mm/reV.

The surface roughness Rmax, measured with a surface roughness measuring instrument (Surfcorder SE-3300 manufactured by Kosaka Kenkyusho) with a measuring speed of 0.5 mm/sec., a measuring length of 2.5 mm and a cut-off of 0.8 mm, was 0.6 μm.

The aluminum cylinder was dip coated with ammoniac aqueous solution of casein (containing 11.2 g of casein, 1 g of 28% ammonia water and 222 ml of water) and was dried to obtain a sub coating of 1.0 g/m$^2$.

Separately 1 part by weight of aluminum chloride phthalocyanine, 1 part by weight of butyral resin (trade name Eslec BM-2 supplied by Sekisui Chemical Co., Ltd.) and 30 parts by weight of isopropyl alcohol were dispersed for 4 hours in a ball mill, and the obtained dispersion was applied on the above-mentioned sub coating by dip coating method and subsequently dried to obtain a charge generating layer of a thickness of 0.3 μm.

Also separately 1 part by weight of a hydrozone compound, 1 part by weight of polysulfone resin (trade name P1700 supplied by Union Carbide Corp.) and 6 parts by weight of monochlorobenzene were mixed and dissolved under agitation, and the resulting solution was applied by dip coating on the above-mentioned charge generating layer, and dried to obtain a charge transport layer of a thickness of 12 μm.

Image formation was conducted by modifying a commercial laser beam printer LBP-SX (made by Canon Inc.) and mounting the photosensitive drum on a commercial cartridge for LBP-SX, and no unevenness in the image was observed.

Also samples 1–17 of photosensitive drum were prepared from cylindrical members obtained from similar aluminum drawn pipes, with the enlarged internal diameter, cutting agent supply amount and suction rate at various levels, and subjected to image formation test. The obtained results are summarized in Table 1.

TABLE 1

| Sample No. | Enlarged internal diameter mm | Cutting agent | Cutting agent supply amount cc/sec | Suction rate m$^3$/min | Groove mm | Tool distance mm | Cutting revolution rpm | Cutting feed rate mm/rev | Rmax μm | Evaluation of image |
|---|---|---|---|---|---|---|---|---|---|---|
| 1 | 0.20 | kerosine | 0.025 | 2.5 | 0.04 60° | 1.50 | 11,000 | 0.04 | 0.60 | ++ |
| 2 | 0.15 | kerosine | 0.03 | 2.5 | 0.03 70° | 2.00 | 11,000 | 0.06 | 0.70 | ++ |
| 3 | 0.10 | kerosine | 0.04 | 3.0 | none | 3.00 | 11,000 | 0.08 | 0.90 | ++ |
| 4 | 0.20 | kerosine | 0.025 | 2.5 | 0.04 60° | 1.50 | 10,000 | 0.04 | 0.50 | ++ |
| 5 | 0.15 | kerosine | 0.03 | 2.5 | 0.03 70° | 2.00 | 10,000 | 0.06 | 0.60 | ++ |
| 6 | 0.10 | kerosine | 0.04 | 3.5 | 0.04 65° | 3.00 | 10,000 | 0.08 | 0.80 | ++ |
| 7 | 0.06 | kerosine | 0.03 | 2.0 | none | 1.20 | 11,000 | 0.08 | 1.30 | + |
| 8 | 0.20 | kerosine | 0.03 | 2.5 | 0.04 60° | 1.50 | 13,000 | 0.06 | 0.90 | ++ |
| 9 | 0.15 | kerosine | 0.04 | 3.5 | 0.03 70° | 2.00 | 13,000 | 0.08 | 1.10 | ++ |
| 10 | 0.10 | kerosine | 0.05 | 4.0 | none | 3.00 | 13,000 | 0.10 | 1.40 | ++ |
| 11 | 0.20 | kerosine | 0.03 | 3.0 | 0.04 60° | 1.50 | 12,000 | 0.06 | 0.80 | ++ |
| 12 | 0.15 | kerosine | 0.04 | 4.0 | 0.03 70° | 3.00 | 12,000 | 0.08 | 1.00 | ++ |
| 13 | 0.06 | kerosine | 0.05 | 2.5 | none | 2.00 | j3,000 | 0.1o | 1.90 | + |
| 14 | 0.02 | kerosine | 0.01 | 1.0 | none | 0.50 | 11,000 | 0.08 | 1.70 | − |
| 15 | 0.02 | kerosine | 0.01 | 7.0 | none | 0.50 | 10,000 | 0.08 | 1.70 | − |
| 16 | 0.02 | kerosine | 0.01 | 1.0 | none | 0.10 | 13,000 | 0.10 | 3.00 | − |
| 17 | 0.02 | kerosine | 0.01 | 7.0 | none | 0.50 | 13,000 | 0.10 | 3.00 | − |

As will be apparent from this table, the samples 1 to 13 provided practically acceptable images, but the samples 14 to 17 showed significant unevenness in the image, presumably because of excessively small enlarged internal diameter and insufficient supply amount of the cutting agent.

EXAMPLE 18

A developing sleeve was prepared by cutting an aluminum drawn pipe (material: A6063) into a predetermined length, cutting the internal surface in the vicinity of an end to expand the internal diameter by 0.2 mm and cutting the external surface with the cutting apparatus M under the following conditions:

Cutting agent: kerosene

Cutting agent supply amount: 0.03 cc/sec.

Suction rate by suction unit: 2.5 m³/min.

Revolution: 13,000 rpm

Cutting feed rate: 0.06 mm/reV.

The surface roughness Rmax was measured with a surface roughness measuring instrument (Surfcorder SE-3300 manufactured by Kosaka Kenkyusho) with a measuring speed of 0.5 mm/sec., a measuring length of 2.5 mm and a cut-off of 0.8 mm, was 1.2 µm.

20 parts by weight of phenolic resin, 18 parts by weight of crystalline graphite and 2 parts by weight of carbon black were sufficiently dispersed into 150 parts by weight of methyl alcohol/methyl cellosolve mixture in a sand mill, and thus obtained coating paint was applied with a spray gun so as to obtain a dry thickness of 10 µm and was thermally cured at 150° C. in a drying oven.

Image formation was conducted by modifying a commercial laser beam printer LBP-SX (made by Canon Co., Ltd.) and mounting the developing sleeve on a commercial cartridge for LBP-SX, and no unevenness in the image was observed.

Owing to the configuration explained in the foregoing, the present invention provides the following advantages.

There can be obtained a cylindrical member with surface precision, roundness and straightness of an extremely high level, and still easily enabling reduction of the manufacturing cost by the reduction in time of the process cycle.

It is also made possible to improve the centering precision of the cutting tools with respect to the work, thereby providing a cylindrical member of high surface precision, roundness and straightness even if the work has thickness unevenness.

Furthermore there can be obtained a cylindrical member with the external curved surface of a high surface precision, as the surface of the work is not damaged by the cutting wastes.

Furthermore, a higher speed and an improved precision in the working process can be achieved, because the cutting wastes are broken to smaller pieces and no longer cling to the cutting tool, whereby avoided are the limitation in cutting speed and the danger of damage to the work surface, resulting from such clinging of the cutting wastes.

What is claimed is:

1. A method for producing a cylindrical member for electrophotography, comprising the steps of:
    working an internal surface of a tubular member having a first internal diameter to form a work area with a second internal diameter greater than the first internal diameter by an amount corresponding to two or three times a thickness unevenness of the tubular member over its entire internal surface;
    supporting said tubular member by support means engaged at the work area of said internal surface; and
    cutting an external curved surface of the supported tubular member with cutting means rotating around an axis of the tubular member to thereby manufacture the cylindrical member.

2. A method for producing a cylindrical member according to claim 1, further comprising the step of:
    collecting cut waste generated in said cutting step with a hood surrounding said cutting means and suction means connected to said hood.

3. A method for producing a cylindrical member according to claim 1, wherein said tubular member is provided on the external curved surface thereof with at least a shallow groove extending along its axial direction to reduce the size of the waste generated upon cutting of the external surface.

4. A method for producing a cylindrical member according to claim 3, wherein cutting waste generated by said cutting means is collected by a hood surrounding said cutting means and suction means connected to said hood.

5. A method for producing a cylindrical member according to claim 2, wherein said tubular member is provided on the surface thereof with at least a shallow groove extending in the axial direction thereof.

6. A method for producing a cylindrical member according to claim 3, wherein said shallow groove has a triangular cross section with an angle within a range from 45° to 90°.

7. A method for producing a cylindrical member according to claim 5, wherein said shallow groove has a triangular cross section with an angle within a range from 45° to 90°.

8. A method for producing a cylindrical member according to claim 3, wherein said tubular member is provided on the external curved surface thereof with 3 to 6 shallow grooves.

9. A method for producing a cylindrical member according to claim 5, wherein said tubular member is provided on the curved peripheral surface thereof with 3 to 6 shallow grooves.

10. A method for producing a cylindrical member according to claim 6, wherein said tubular member is provided on the external peripheral surface thereof with 3 to 6 shallow grooves.

11. A method for producing a cylindrical member according to claim 1, wherein a cutting agent is supplied to at least one side of the cutting means.

12. A method for producing a cylindrical member according to claim 2, wherein a cutting agent is supplied to at least one side of the cutting means.

13. A method for producing a cylindrical member according to claim 3, wherein a cutting agent is supplied to at least one side of the cutting means.

14. A method for producing a cylindrical member according to claim 6, wherein a cutting agent is supplied to at least one side of the cutting means.

15. A method for producing a cylindrical member according to claim 8, wherein a cutting agent is supplied to at least one side of the cutting means.

16. A method for producing a cylindrical member according to claim 11, wherein the supplied cutting agent is collected by a hood surrounding the cutting means and suction means connected to said hood.

17. A method for producing a cylindrical member according to claim 1, wherein the cutting means includes a rough cutting tool and a finish cutting tool mutually separated by a predetermined distance along a predetermined axis.

18. A method for producing a cylindrical member according to claim 2, wherein the cutting means includes a rough cutting tool and a finish cutting tool mutually separated by a predetermined distance along a predetermined axis.

19. A method for producing a cylindrical member according to claim 3, wherein the cutting means includes a rough cutting tool and a finish cutting tool mutually separated by a predetermined distance along a predetermined axis.

20. A method for producing a cylindrical member according to claim 6, wherein the cutting means includes a rough cutting tool and a finish cutting tool mutually separated by a predetermined distance along a predetermined axis.

21. A method for producing a cylindrical member according to claim 8, wherein the cutting means includes a rough cutting tool and a finish cutting tool mutually separated by a predetermined distance along a predetermined axis.

22. A method for producing a cylindrical member according to claim 11, wherein the cutting means includes a rough cutting tool and a finish cutting tool mutually separated by a predetermined distance along a predetermined axis.

23. A method for producing a cylindrical member according to claim 16, wherein the cutting means includes a rough cutting tool and a finish cutting tool mutually separated by a predetermined distance along a predetermined axis.

* * * * *

UNITED STATES PATENT AND TRADEMARK OFFICE
CERTIFICATE OF CORRECTION

PATENT NO. : 5,887,498

DATED : March 30, 1999

INVENTOR(S) : Miyamoto et al.

It is certified that error appears in the above-identified patent and that said Letters Patent is hereby corrected as shown below:

Title page, item
[56] REFERENCES CITED:

FOREIGN PATENT DOCUMENTS, "4-04310303" should read --4-310303-- and "A-0212403" should read --63-212403--.

COLUMN 7:

Line 27, "If" should read --1f--.
Line 52, "if" should read --1f--.
Line 55, "if" should read --1f--.

COLUMN 12:

TABLE 1, No. 13, "j3,000    0.1o" should read
--13,000    0.10--.

Signed and Sealed this

Sixteenth Day of November, 1999

*Attest:*

*Attesting Officer*

Q. TODD DICKINSON

*Acting Commissioner of Patents and Trademarks*